Patented May 21, 1940

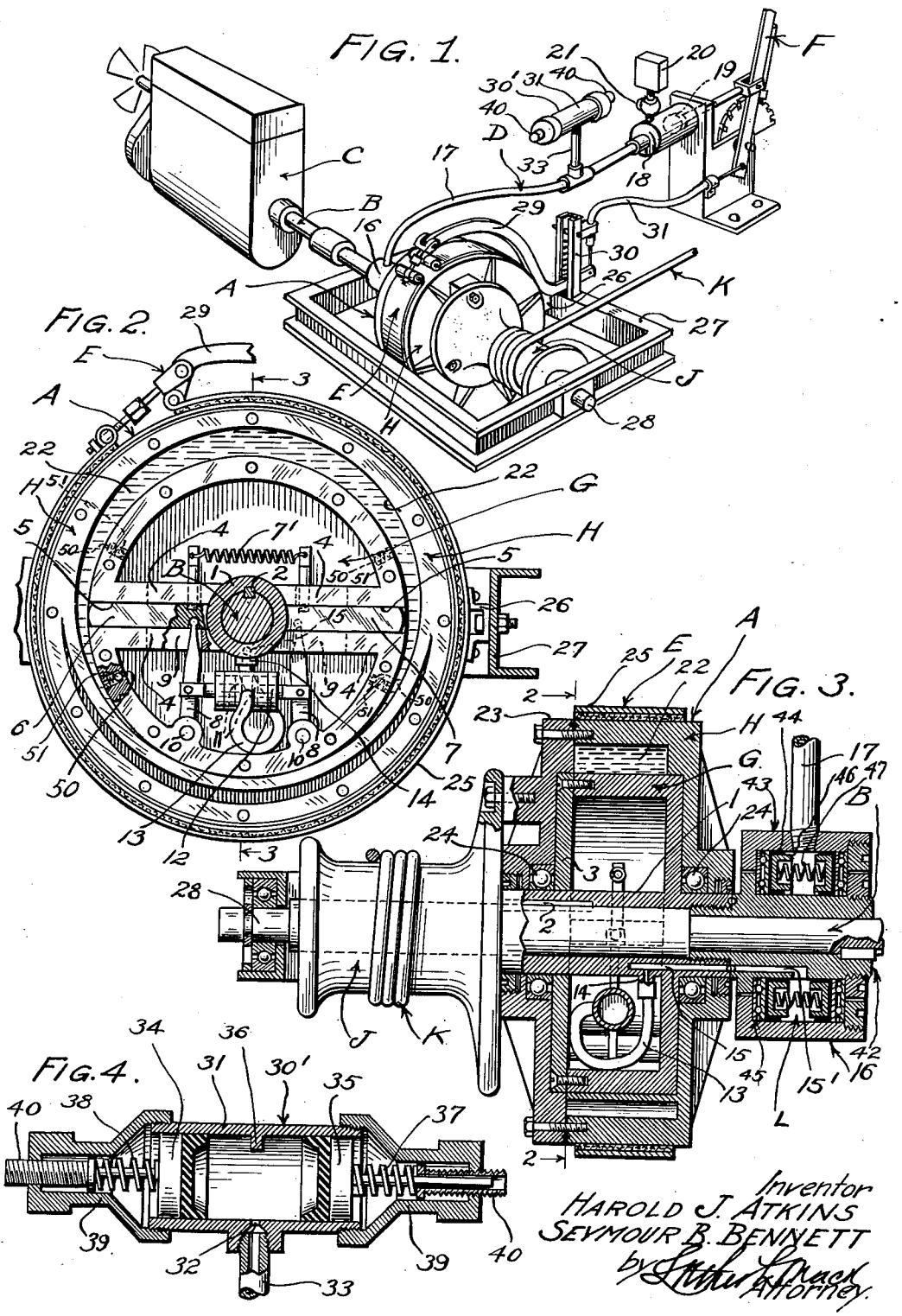

2,201,878

UNITED STATES PATENT OFFICE 2,201,878

HYDRAULIC DRIVE AND CONTROL DEVICE

Harold J. Atkins, Pocoima, and Seymour B. Bennett, San Fernando, Calif., assignors to C. C. Goodson and John F. Fischbeck, Los Angeles, Calif.

Application November 4, 1938, Serial No. 238,928

6 Claims. (Cl. 192—58)

This invention relates to a new and efficient device for hydraulically driving and controlling machines and power operated apparatus, as by serving as a variable speed power transmission means, or as a clutch or both, with provision also for use as a brake and as a fly wheel.

A purpose of this invention is to provide a hydraulic drive and control means which may be constructed as a comparatively small, simple, inexpensive and compact single unit to take the place of separate units such as the transmission, the clutch, the brake, and the fly wheel which are usually employed in operating and controlling power operated machinery, the single drive and control unit hereof being subject to selective use as a variable speed power transmission and/or clutch and also being adapted to serve as a fly wheel and as a brake, and, altho particularly adapted for use in positioning and controlling the earth working elements of earth handling apparatus such as power shovels, bulldozers and the like, is also subject to various other power transmission and control uses.

Another of the purposes of the invention is to provide a combined variable speed drive and clutch means wherein the driving and clutching and other provisions thereof are hydraulically effected thru the instrumentality of driving and driven members which are operatively coupled and uncoupled for rotation at the same or relative speeds thru the medium of a body of hydraulic fluid, and an associated means for effecting and varying the coupling action of said fluid to the extent that variable speeds and clutching and braking operations are afforded in a particularly efficacious manner.

Another purpose of the invention is to provide a hydraulic drive and control unit of the character described, which includes a novel pressure relief means or equalizer for preventing the forces of the hydraulic pressures developed in the unit from being transmitted to and interfering with the operation of the means provided for controlling the unit, said last-named means including adjustable vanes and hydraulic adjusting means therefor, both of which would be difficult if not impossible to maintain in operative positions against the said pressures, were it not for said pressure relief means.

We have shown a preferred form of hydraulic drive and control device in the accompanying drawing, embodying our invention, subject, however, to modification within the scope of the appended claims, without departing from the spirit of our invention.

Referring to the drawing:

Fig. 1 is a schematic perspective showing the hydraulic drive and control unit of this invention as operated by an internal combustion engine for transmitting power to and controlling the operation of various machines and apparatus.

Fig. 2 is a sectional view of the body portion of the device taken on the plane of line 2—2 of Fig. 3.

Fig. 3 represents a sectional view at right angles to Fig. 2 and as taken on line 3—3 of Fig. 2.

Fig. 4 represents a longitudinal section of the pressure relief or equalizing means embodied in the hydraulic operating means hereof.

In the embodiment of this invention which is shown in detail in the accompanying drawing, the main or body portion A of the hydraulic drive and control means hereof is connected with and operated by the drive shaft B of an internal combustion motor C and is controlled by a hydraulic operating means D and a mechanical brake E. As here shown, the control means D and brake E are operated by means of a common lever F. The body A generally includes a driving member G fixed to the shaft B and operatively associated, as will be hereinafter more fully described, with a driven member H. A pulley or drum J is fixed on the driven member H as a cable K is associated therewith in the usual manner for operating and controlling mechanism or apparatus, not shown.

It should be noted that in the present embodiment of this invention, the unit A and associated elements are constructed and arranged to selectively serve as a hydraulic clutch, a hydraulic variable speed transmission, a fly wheel and a brake, under control of a single lever F. However, it should be understood and it will be apparent as the description hereof progresses, that the device of this invention may be operated by prime movers and drive means other than here shown, and may be exclusively or collectively or otherwise put to any one or more of the aforementioned or other possible uses and also employed in various ways as a drive and control means for various power operated machines, as within the scope of this invention. In this connection it is seen that the invention, broadly considered, embraces any mechanism or device wherein, when one of the two members, such as the ones G and H here shown, is rotated or driven, a control of the movement of one or both of said members will be afforded by reason of the hydraulic medium and associated means as here provided, for establishing a drive connection between and relatively controlling said members.

The drive member G is in the form of a hollow cylinder having a hub 1 keyed to the shaft B, as shown at 2, and also provided with a removable side wall 3 and with partitions 4 having radial slots 5 which open on the periphery of the member. Mounted in these slots for reciprocal movement are vanes 6 and 7 which are adapted to be extended against the action of a retractile spring 7' by means of levers 8 pivoted thereto and slidable in slots 9 in the partitions 4. These levers are pivoted as at 10 interiorly of the drive member and are adapted to be rocked by means of pistons 11 pivoted thereto and slidable in a hydraulic cylinder 12 disposed between said levers. Operating fluid, such as oil, is conducted to said cylinder between the pistons 11 so as to simultaneously move said pistons outwardly and rock said levers whereby to correspondingly extend the vanes, thru a conduit on pipe 13 connected with a nipple 14 on the hub 1. The hub is provided with a hydraulic fluid passage 15 communicating with the nipples 14 and with a passage 15' of a suitable rotary hydraulic fluid coupling device 16 mounted on the shaft B. This coupling device is connected by means of a pipe line 17 with a hydraulic ram 18, and the piston 19 of said ram is connected with the operating lever F. A hydraulic fluid supply tank 20 is connected with the ram 18 and controlled by a check valve 21 whereby on the return stroke of the piston 19, a supply of fluid may be drawn into the system to compensate for leakage.

When the lever F is manipulated to operate the piston 19 of the ram 18, the operating fluid is forced thru the pipe 17 thru the coupling 16, passage 15, nipple 14, pipe 13, into the cylinder 12, whereupon the pistons 11 therein will be simultaneously operated to extend the vanes.

The driven member H is in the form of a cylindrical drum having an eccentric chamber 22 and a removable side wall 23. This drum is mounted on bearings 24 on the shaft B so as to rotate freely with respect to the shaft and houses the drive member G in said chamber, opposite walls of the drum being recessed to receive side portions of the drive member G. It is noted that the drive member G is concentric with the shaft and driven member H as to the outer periphery of the latter, but the chamber 22 is eccentric to said shaft. The drive member G is mounted so as to contact at one point in its periphery the corresponding portion of the eccentric chamber 22, whereby to define a crescent-shaped space or chamber between the members G and H, in which space or chamber the vanes 6 and 7 are extensible and movable for the purpose of creating pressures upon the wedge-shaped and arcuate columns of hydraulic fluid confined between said drive and driven members. In this connection it should be noted that the chamber 22 is filled with a suitable hydraulic fluid such as oil, as is also the space interiorly of the hollow drive member G.

As here shown, a drum or pulley J is fixed to the driven member H for operating a cable K to control other machinery, not shown, but it is understood that any other drive connection for operating any machinery or machine elements may be used as between such machinery and the member H.

The brake E embodied herein comprises a brake band 25 operating on the periphery of the member H and supported by a suitable bracket 26 attached to a frame 27, in which latter the shaft 28 for the drum J is journaled. A brake operating lever 29 is connected in the usual manner with the brake band 25 and is normally held in a position applying the brakes by means of a spring device 30 fixed to the frame 27. A Bowden wire control 31 is connected with the lever 29 and the operating lever F so that upon manipulation of the latter to extend the vanes 6 and 7 for establishing a driving connection between the driving and driven members, the brake will be released.

Forming a part of the hydraulic operating means D is a pressure relieving and equalizing means generally designated 30', and which is particularly shown in Figs. 1 and 4. This means includes a hydraulic cylinder 31 having a single intake opening 32 intermediate its ends, to which openings is connected a pipe 33 which is also connected in the pipe line 17. The space in this cylinder 31 between suitably packed pistons 34 and 35 is filled with hydraulic fluid. The pistons 34 and 35 are normally held against a stop member 36 centrally of the ends of the cylinder 31, by means of springs 37 and 38 arranged between the pistons and closed ends 39 of the cylinder. The tension of these springs may be varied by suitable adjusting means 40. The purpose of the equalizing and pressure relieving means is to prevent the pressures created during the operation of the unit from being transmitted back to the operating lever F and interfering with the proper manipulation of said lever, and for also preventing the pressures from interfering with the predetermined operation of the vanes.

In the operation of the drive and control unit hereof with the same, arranged as shown in Fig. 1, as driven by the internal combustion engine C, it is seen that when the vanes are retracted, as shown in Fig. 2, the drive member G will rotate freely relative to the driven member H and will thus serve as a fly wheel. Creeping of the driven member H is prevented by the brake means E which, as previously described, is normally applied.

When it is desired to use the drive means as a clutch to establish a direct driving connection between member G and member H, the operator moves the lever F so that the ram G will force hydraulic fluid under pressure thru the pipe line 17, coupling box 15, passage, nipple 14, conduit 13, to the cylinder 12, in such manner as to fully extend the pistons 11. This will rock the levers 8 and fully extend the vanes 6 and 7 simultaneously so that the outer ends of said vanes will contact the cylindrical wall of the eccentric chamber 22. The pressures thus set up by the vanes on the wedge-shaped column of hydraulic fluid which is between the vanes and the point of contact of the members G and H with one another, will cause said column of fluid to establish a driving connection which is as positive as tho mechanical means were employed and the driven member will be immediately drivingly connected for operation of the drum J and cable K or any other driven means connected with said driven members. Inasmuch as the members G and H do not rotate relative to one another at this time, the vanes 6 and 7 are not changed as to their positions and the pressure relieving and equalizing means 30' does not have any particular function. Declutching is effected by simply retracting the lever F and thus allowing the spring 7' to retract the vanes 6 and 7.

When the device hereof is to be used as a variable speed transmission, the lever F is manipulated so as to but partially extend the vanes 6 and 7 and the pressure on the fluid is such that while a driving connection is established thereby, the driving member will move at a faster rate than the driven member, due to the escape of fluid between the outer ends of the vanes and the cylindrical wall of the chamber 22. Under this arrangement the vanes will be moved inwardly when they contact with the cylindrical wall of the member 22 during each revolution of the drive member, but the arrangement is such that when one vane is moved inwardly, the other remains extended and the pressure on the fluid is maintained whereby the fluid will drive the member H. This inward moving of the one vane will likewise move the piston 11 associated therewith and such movement of said piston will set up an additional hydraulic pressure in the fluid lines of the operating means D. This additional pressure is absorbed in the cylinder 31, due to the fact that the force of the springs 37 and 38 controlling the pistons 34 and 35 is less than that of the spring 7' and the pistons 37 and 38 will therefore be moved outwardly to increase the cubic content of said cylinder. Therefore, it is thus seen that the movement of one of the pistons 11 as caused by the pushing inward of one of the vanes, will not cause the other piston to move outwardly and therefore extend the other vane beyond its original setting. Due to the fact that this increased pressure is absorbed in the cylinder 31, the operator will have no difficulty in holding the lever F in the desired position. Moreover, when the vane which has been pushed inwardly by its contact with the driven member, moves clear of such point of contact, due to relative rotation of members G and H, the stored up pressure in the system will become effective to extend said vane to its original setting, so that a predetermined speed will be maintained. Various relative speeds may be obtained by varying the positions of the vanes 6 and 7 thru manipulation of the lever F.

It will be apparent that the device hereof may also be used as a hydraulic brake by simply attaching one of the members G and H to a wheel or other rotating part to be controlled, and mounting the other as required to effect a braking action.

It will be noted that the fluid coupling device 16 comprises a rotary portion 42 fixed to the shaft B and operating within a stationary annular portion 43 so as to form with the latter a sectional hollow cylinder generally designated L. The pipe 17 is connected with a portion 43 and discharges interiorly of said cylinder and the passage 15' likewise communicates with said cylinder. In order to provide leak-proof seals for the joints of the cylinder, annular flexible packing members 44 are mounted in the cylinder so that the outer faces thereof will contact annular rotary thrust bearings 45. Annular pressure rings 46 are engaged upon the inner sides of the packing rings 44 and have expansion springs 47 engaged therebetween so as to urge said rings 46 apart whereby to hold and expand the packing rings 44 so as to form leak-proof seals. It is noted that the hydraulic fluid in the cylinder L will also act to force the pressure rings apart so as to expand the sealing rings 44.

In view of the fact that the hydraulic fluid in the chamber 22 will leak past the vanes 6 and 7 and enter the spaces in the grooves 5 which are formed when the vanes are extended outwardly, it is necessary to provide for the return of said fluid to the chamber. The spaces behind the vanes are in communication with the interior of the driving member G thru the slots 9 for the levers 8. The member G is provided in the cylindrical wall thereof with a plurality of passages 50 for communicating the interior of the member G with the chamber 22. These passages are controlled by spring loaded check valves 51, each of which opens outwardly. As the vanes move past the point of contact with the cylindrical wall of the eccentric chamber 22, a vacuum is created and the oil under pressure in the member G will open said check valves and flow thru the passages 50 into the chamber 22. It is noted that the passages 50 are arranged on opposite sides of the vanes and so that the above described operation will take place regardless of the direction of the rotation of the member G.

We claim:

1. A hydraulic drive and control device including a rotary cylindrical driven member, having an eccentric chamber therein adapted to be filled with hydraulic fluid, a cylindrical driving member rotatably mounted in said chamber and having its periphery in contact at one point with the cylindrical wall of said chamber, vanes carried by the driving member and extensible therefrom in the space between the driving and driven member and adapted to be pushed inwardly upon contact of the outer ends thereof with the point of said cylindrical wall which engages the driving member, a spring connected with and normally holding said vanes in position lying inwardly of the space between said members, an operating cylinder carried by said driving member, opposed pistons mounted in said operating cylinder, means of operative connection between said pistons and said vanes for simultaneously extending said vanes upon corresponding outward movement of said pistons, means for applying a hydraulic fluid under pressure to said cylinder for extending said pistons, including a hydraulic ram connected with said cylinder and a manually operable means for developing fluid pressures in said ram.

2. A hydraulic drive and control device including a rotary cylindrical driven member, having an eccentric chamber therein adapted to be filled with hydraulic fluid, a cylindrical driving member rotatably mounted in said chamber and having its periphery in contact at one point with the cylindrical wall of said chamber, vanes carried by the driving member and extensible therefrom in the space between the driving and driven member and adapted to be pushed inwardly upon contact of the outer ends thereof with the point of said cylindrical wall which engages the driving member, a spring connected with and normally holding said vanes in position lying inwardly of the space between said members, an operating cylinder carried by said driving member, opposed pistons mounted in said operating cylinder, means of operative connection between said pistons and said vanes for simultaneously extending said vanes upon corresponding outward movement of said pistons, means for applying a hydraulic fluid under pressure to said cylinder for extending said pistons, including a hydraulic ram connected with said cylinder and a manually operable means for developing fluid pressures in said ram, and a pressure relief chamber connected in the hydraulic system for the operating cylinder, a spring loaded piston in said last-named chamber arranged to move and increase the cubic content of said chamber incident to hydraulic pressure developed by inward movement of one of said operating pistons when one of the vanes is moved inwardly by its contact with the cylindrical wall of said eccentric chamber.

3. A hydraulic drive and control device comprising a rotary drum having an eccentric chamber therein and adapted to be filled with a hydraulic fluid, a rotary member eccentrically mounted in said chamber and having its periphery engaged at one point with the inner periphery of said drum, and means operable in the space of the chamber between said members and during rotation of one of said members for setting up pressures on the hydraulic fluid for controlling the movement of said rotary members, one as to the other, thru the instrumentality of said hydraulic fluid, said last-named means including vanes extensible from one of said members into the chamber space between said members, an operating cylinder, pistons in said operating cylinder, means of connection between said pistons and said vanes for extending the latter upon outward movement of said pistons, a hydraulic system connected with said operating cylinder for applying thereto fluid under pressure to move said pistons outwardly, including a hydraulic ram, a manually operable means for operating said ram, a pressure relief chamber connected in said system between the ram and operating cylinder and a spring loaded piston movable under the influence of hydraulic pressure in said system for increasing the cubic capacity of said relief chamber.

4. A hydraulic drive and control device comprising a rotary drum having an eccentric chamber therein and adapted to be filled with a hydraulic fluid, a rotary member eccentrically mounted in said chamber and having its periphery engaged at one point with the inner periphery of said drum, and means operable in the space of the chamber between said members and during rotation of one of said members for setting up pressures on the hydraulic fluid for controlling the movement of said rotary members, one as to the other, thru the instrumentality of said hydraulic fluid, said last-named means including vanes extensible from one of said members into the chamber space between said members, an operating cylinder, pistons in said operating cylinder, means of connection between said pistons and said vanes for extending the latter upon outward movement of said pistons, a hydraulic system connected with said operating cylinder for applying thereto fluid under pressure to move said pistons outwardly, including a hydraulic ram, a manually operable means for operating said ram, a pressure relief chamber connected in said system between the ram and operating cylinder and a spring loaded piston movable under the influence of hydraulic pressure in said system for increasing the cubic capacity of said relief chamber, and means for varying the spring tension on said spring loaded piston.

5. A hydraulic drive and control device comprising a rotary drum having an eccentric chamber therein and adapted to be filled with a hydraulic fluid, a rotary member eccentrically mounted in said chamber and having its periphery engaged at one point with the inner periphery of said drum, and means operable in the space of the chamber between said members and during rotation of one of said members for setting up pressures on the hydraulic fluid for controlling the movement of said rotary members, one as to the other, thru the instrumentality of said hydraulic fluid, the second named rotary member being hollow and adapted to contain a hydraulic fluid and provided with vane receiving slots which are in communication with the hollow interior thereof, vanes slidable in said slots into the eccentric chamber, means for returning to the eccentric chamber oil which may leak past said vanes into the interior of the second-named rotary member, including passages in the periphery of the second-named chamber for conducting fluid from the latter into the eccentric chamber, outwardly opening spring loaded check valves controlling said passages, a cylinder in said rotary member, opposed pistons in said cylinder, means of mechanical connection between said pistons and said vanes for moving said vanes when said pistons are moved, spring means normally holding said vanes retracted, and means for introducing a fluid into the cylinder for extending the pistons therein.

6. A hydraulic device comprising a drum having an eccentric chamber therein adapted to be filled with a hydraulic fluid, a rotary member eccentrically mounted in said chamber and having its periphery engaged at one point with the inner periphery of said drum, and means operable in the space of the chamber between said members and during rotation of said rotary member for setting up pressures on the hydraulic fluid for controlling the movement of said rotary member, said last-named means including vanes carried by said rotary member and movable into said chamber and hydraulically operated means for so moving said vanes, a pressure relief chamber connected with said hydraulically operated means and means moving in said chamber responsive to hydraulic pressure in said hydraulic means for increasing the cubic capacity of said relief chamber.

HAROLD J. ATKINS.
SEYMOUR B. BENNETT.